US011645003B2

(12) United States Patent
Okamoto et al.

(10) Patent No.: US 11,645,003 B2
(45) Date of Patent: May 9, 2023

(54) MEMORY SYSTEM GENERATING PARITY DATA BASED ON WRITTEN DATA AND CONTROL METHOD

(71) Applicant: Kioxia Corporation, Tokyo (JP)

(72) Inventors: Atsushi Okamoto, Yokohama Kanagawa (JP); Tetsuya Yasuda, Kamakura Kanagawa (JP); Akinori Nagaoka, Tokyo (JP)

(73) Assignee: Kioxia Corporation, Tokyo (JP)

( * ) Notice: Subject to any disclaimer, the term of this patent is extended or adjusted under 35 U.S.C. 154(b) by 7 days.

(21) Appl. No.: 17/348,412

(22) Filed: Jun. 15, 2021

(65) Prior Publication Data

US 2022/0300189 A1 Sep. 22, 2022

(30) Foreign Application Priority Data

Mar. 17, 2021 (JP) .............................. JP2021-043664

(51) Int. Cl.
*G06F 3/06* (2006.01)
*G06F 11/10* (2006.01)

(52) U.S. Cl.
CPC .......... *G06F 3/0655* (2013.01); *G06F 3/0604* (2013.01); *G06F 3/0679* (2013.01); *G06F 11/1096* (2013.01)

(58) Field of Classification Search
CPC .................... G06F 11/1076; G06F 11/1096
See application file for complete search history.

(56) References Cited

U.S. PATENT DOCUMENTS

| 9,483,210 | B2 | 11/2016 | Olbrich et al. |
| 9,647,693 | B2 | 5/2017 | Tsuboi et al. |
| 9,792,172 | B2 | 10/2017 | Kanno |
| 2015/0194984 | A1 | 7/2015 | Tsuboi et al. |
| 2016/0034227 | A1 | 2/2016 | Olbrich et al. |
| 2017/0024276 | A1 | 1/2017 | Kanno |
| 2019/0081643 | A1* | 3/2019 | Ikeuchi ............. H03M 13/2906 |
| 2019/0187902 | A1* | 6/2019 | Lee .......................... G06F 12/10 |
| 2021/0089449 | A1* | 3/2021 | Simionescu ........ G06F 12/0897 |

* cited by examiner

*Primary Examiner* — David Yi
*Assistant Examiner* — Nicholas A. Paperno
(74) *Attorney, Agent, or Firm* — Allen & Overy LLP (57) ABSTRACT

According to one embodiment, a memory system includes a non-volatile memory, and a controller configured to control the non-volatile memory. The controller is configured to write data to the non-volatile memory, read the written data from the non-volatile memory after writing of the data is completed, generate parity data corresponding to the read data, and write the generated parity data to a memory for parity storage.

18 Claims, 8 Drawing Sheets

MEMORY SYSTEM GENERATING PARITY DATA BASED ON WRITTEN DATA AND CONTROL METHOD

CROSS-REFERENCE TO RELATED APPLICATIONS

This application is based upon and claims the benefit of priority from Japanese Patent Application No. 2021-043664, filed Mar. 17, 2021, the entire contents of which are incorporated herein by reference.

FIELD

Embodiments described herein relate generally to a memory system and a control method.

BACKGROUND

A memory system including a non-volatile memory is known. Such a memory system writes data to the non-volatile memory and reads data from the non-volatile memory. An error may occur in data read from the non-volatile memory. For this reason, parity data may be used to detect an error that has occurred and to correct the error. The parity data is generated when data written to the non-volatile memory. A memory different from the non-volatile memory may be used for calculation related to generation of the parity data.

DETAILED DESCRIPTION

An embodiment will be described hereinafter with reference to the accompanying drawings. In the following description, constituent elements having substantially the same function and configuration will be denoted by the same reference number, and description will be repeated only when necessary. Further, the following embodiment illustrates a device and a method which give concrete forms to technical ideas, and the technical ideas of the embodiment are not intended to limit materials, shapes, structures, arrangements, etc., of components to those descried below. The technical ideas of the embodiment can be modified in various manners in the scope of patent claims.

In general, according to one embodiment, a memory system includes a non-volatile memory, and a controller configured to control the non-volatile memory. The controller is configured to write data to the non-volatile memory, read the written data from the non-volatile memory after writing of the data is completed, generate parity data corresponding to the read data, and write the generated parity data to a memory for parity storage.

First Embodiment

Figure 1:
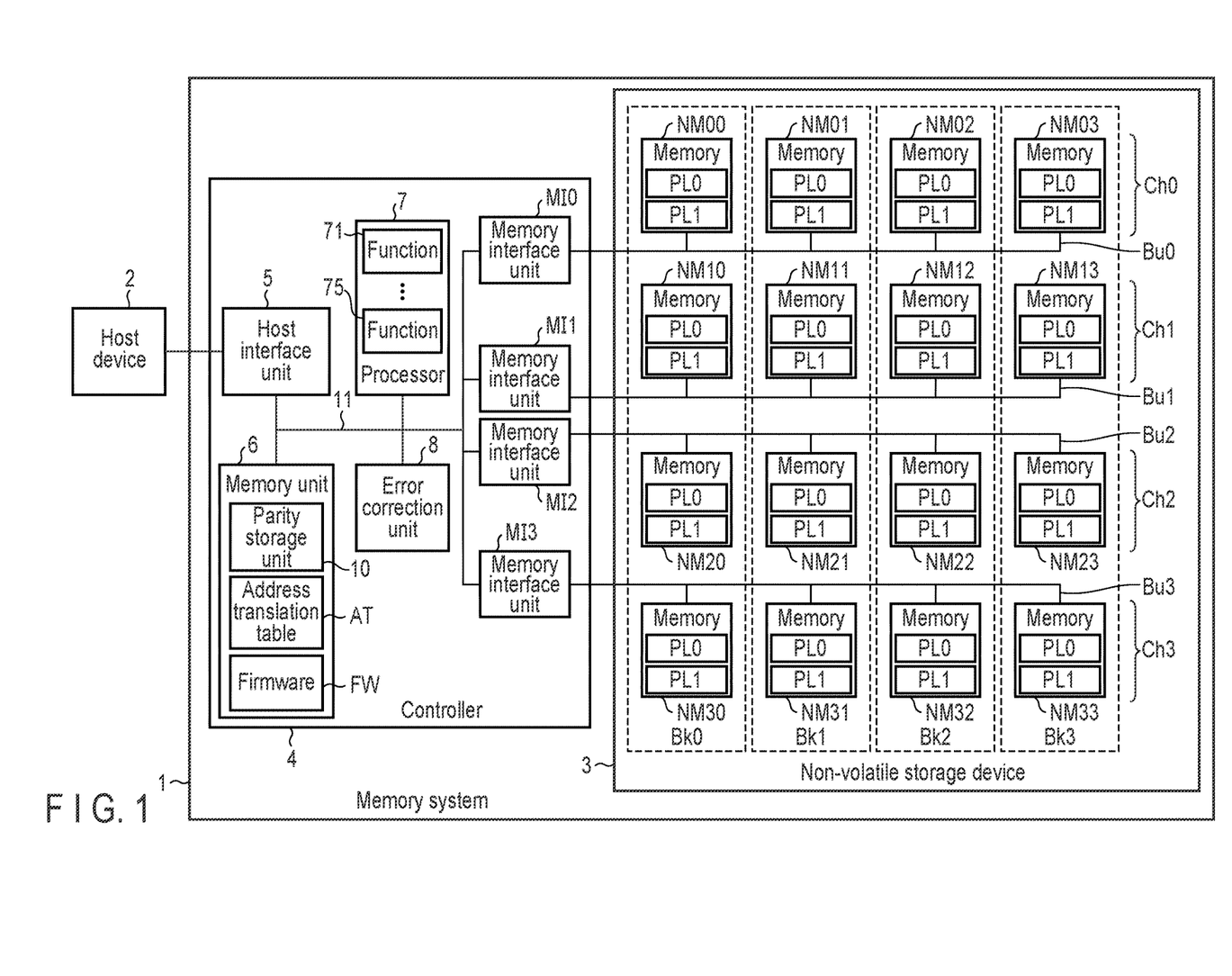
FIG. 1 is a block diagram illustrating an example of a configuration of a memory system according to a first embodiment.

FIG. 1 is a block diagram illustrating an example of a configuration of a memory system 1 according to a first embodiment.

The memory system 1 is, for example, a sold state drive (SSD). The memory system 1 may be any of various types of storage devices such as a universal flash storage (UFS) device, a universal serial bus (USB) memory, a memory card, a hybrid storage system including a hard disk drive and an SSD, and the like. The memory system 1 can communicate with a host device (for example, an external information processing device) 2.

The memory system 1 includes a non-volatile storage device 3 and a controller 4.

The non-volatile storage device 3 includes memories NM00 to NM33 which are non-volatile. Hereinafter, when the memories NM00 to NM33 are not distinguished, each of the non-volatile memories NM00 to NM33 may be simply referred to as a memory NM.

Each of the memories NM00 to NM33 may be a non-volatile semiconductor memory having a storage unit having a two-dimensional structure or a three-dimensional structure. Each of the memories NM00 to NM33 may be a memory chip.

Specifically, the memories NM00 to NM33 may be, for example, NAND flash memories. The memories NM00 to NM33 may be any one of, for example, a NOR flash memory, a magnetoresistive random access memory (MRAM), a phase change random access memory (PRAM), a resistive random access memory (ReRAM), a ferroelectric random access memory (FeRAM), and the like.

The memories NM00 to NM33 are grouped by a bank Bk0, a bank Bk1, a bank Bk2, and a bank Bk3. Hereinafter, when the banks Bk0 to Bk3 are not distinguished, each of the banks Bk0 to Bk3 may be simply referred to as a bank Bk.

The bank Bk0 corresponds to the memories NM00, NM10, NM20, NM30. The bank Bk1 corresponds to the memories NM01, NM11, NM21, NM31. The bank Bk2 corresponds to the memories NM02, NM12, NM22, NM32. The bank Bk3 corresponds to the memories NM03, NM13, NM23, NM33.

The memories NM00 to NM33 are grouped over a channel Ch0, a channel Ch1, a channel Ch2, a channel Ch3.

Each of the memories NM00 to NM03 is connected to a bus Bu0. The memories NM00 to NM03 correspond to the channel Ch0.

Each of the memories NM10 to NM13 is connected to a bus Bu1. The memories NM10 to NM13 correspond to the channel Ch1.

Each of the memories NM20 to NM23 is connected to a bus Bu2. The memories NM20 to NM23 correspond to the channel Ch2.

Each of the memories NM30 to NM33 is connected to a bus Bu3. The memories NM30 to NM33 correspond to the channel Ch3.

Each of the memories NM00 to NM33 includes a plane PL0 and a plane PL1. The controller 4 can write or read data in parallel to the plane PL0 and the plane PL1 included in a certain memory NM. Hereinafter, when the planes PL0, PL1 are not distinguished, each of the planes PL0, PL1 may be simply referred to as a plane PL.

The controller 4 controls the memories NM00 to NM33 according to a command received from the host device 2. The controller 4 controls the memories NM00 to NM33 as background processing without receiving a command from the host device 2. More specifically, the controller 4 controls writing of data to the non-volatile storage device 3 and controls reading of data from the non-volatile storage device 3.

For example, the controller 4 executes a control for a garbage collection on the memories NM00 to NM33 included in the non-volatile storage device 3. The garbage collection is, for example, processing of rearranging (or rewriting) data, which is arranged (or stored) in fragments in garbage collection source blocks in the memories NM00 to NM33, collectively into a garbage collection destination block, and invalidating data in the garbage collection source blocks. The garbage collection may be referred to as compaction.

In the first embodiment, in data writing processing, the controller 4 writes data to the non-volatile storage device 3, reads the written data from the non-volatile storage device 3 after completion of writing of the data, generates parity data (or parity information) corresponding to the read data, and writes the generated parity data to a memory for parity storage such as the non-volatile storage device 3 in a non-volatile state.

In data reading processing, the controller 4 performs error detection and error correction on data read from the non-volatile storage device 3, using the parity data corresponding to the read data. In this reading processing, the controller 4 may read the parity data corresponding to the read data from the non-volatile storage device 3.

The controller 4 includes a host interface unit 5, memory interface units MI0 to MI3, a memory unit 6, a processor 7, and an error correction unit 8. The host interface unit 5, the memory interface units MI0 to MI3, the memory unit 6, the processor 7, and the error correction unit 8 can transmit or receive data, information, a signal, a command, a request, a message, an instruction, a response, and the like to each other via a bus 11.

The host interface unit 5 is a circuit conforming to a predetermined standard. The host interface unit 5 receives data, information, a signal, a command, a request, a message, an instruction, a response, and the like from the host device 2. The host interface unit 5 transmits data, information, a signal, a command, a request, a message, an instruction, a response, and the like to the host device 2.

The predetermined standard may be, for example, a non-volatile memory express (NVMe) (registered trademark) standard, a peripheral component interconnect express (PCIe) (registered trademark) standard, a serial advanced technology attachment (SATA) standard, or a serial attached small computer system interface (SAS) standard.

The memory interface units MI0 to MI3 correspond to the channels Ch0 to Ch3, respectively. The memory interface units MI0 to MI3 are circuits that transmit and receive data, information, signals, commands, requests, messages, instructions, responses, and the like to and from the memories NM00 to NM03. Writing or reading with respect to the memories NM00 to NM03 by the memory interface unit MI0, writing or reading with respect to the memories NM 10 to NM 13 by the memory interface unit MI1, writing or reading with respect to the memories NM 20 to NM 23 by the memory interface unit MI2, and writing or reading with respect to the memories NM 30 to NM33 by the memory interface unit MI3 can be executed in parallel with each other. In other words, the controller 4 can execute writing or reading in parallel for a plurality of channels among the channels Ch0 to Ch3. In the description below, for the sake of simplicity, the memory interface units MI0 to MI3 may be omitted. The number of channels and the number of memory interface units may not be three, but may be one, two, or four or more.

The memory unit 6 stores, for example, firmware FW and an address translation table AT. The memory unit 6 includes a parity storage unit 10 used for work, for example, to generate parity data. The memory unit 6 may be, for example, a static random access memory (SRAM). The memory unit 6 may be, for example, a combination of a dynamic random access memory (DRAM) and an SRAM. The memory unit 6 may be disposed outside the controller 4 instead of inside the controller 4.

The memory unit 6 may store the generated parity data in a non-volatile state.

The firmware FW is an example of software executed by the processor 7. The firmware FW includes, for example, a code and data. The firmware FW is executed by the processor 7 to control the host interface unit 5, the memory interface units MI0 to MI3, the memory unit 6, and the error correction unit 8.

In the first embodiment, the firmware FW causes, for example, the processor 7 to implement functions 71 to 75.

The function 71 detects that first data of a particular amount (first amount) has been written to the non-volatile storage device 3. Alternatively, the function 71 may detect that the first data has been written to a particular position of the non-volatile storage device 3. Here, the amount of data may mean, for example, a size of data. The amount of data may mean the number of pieces of data having a particular size.

When the first data of the particular amount is written to the non-volatile storage device 3, the function 72 detects a memory size that can be used as the parity storage unit 10, and determines (or selects) data that is included in the written first data (more specifically, the first data that has been written) and is read as a parity generation target based on the detected memory size. Here, the parity generation target is data used when generating parity data. Alternatively, when the first data is written to a particular position of the non-volatile storage device 3, the function 72 may determine data that is included in the written first data and is read as the parity generation target.

The function 73 reads the data determined as the parity generation target from the non-volatile storage device 3.

The function 74 generates parity data corresponding to the read data using the error correction unit 8 and the parity storage unit 10.

The function 75 writes the generated parity data in a non-volatile state to a parity storage memory such as the memory unit 6, the non-volatile storage device 3, or another non-volatile memory (not illustrated).

The address translation table AT associates logical addresses of data stored in the memories NM00 to NM33 with physical addresses specifying positions where the data are stored. The address translation table AT may be referred to as a lookup table. The logical address may be, for example, a logical block addressing (LBA). The physical address may be, for example, a physical block addressing (PBA).

The error correction unit 8 is a circuit that executes error detection processing and error correction processing using an error correcting code (ECC) or the like, for example. More specifically, the error correction unit 8 generates parity data corresponding to data while using the parity storage unit 10 according to a control executed by the processor 7. The error correction unit 8 detects and corrects an error of read data based on data read from the memories NM00 to NM33 and parity data corresponding to the read data according to a control executed by the processor 7. The error correction unit 8 may be provided in the processor 7, for example. The error correction unit 8 may be provided in each of the memory interface units MI0 to MI3.

The processor 7 executes various controls in accordance with the firmware FW.

The processor 7 is any of various processing devices such as a central processing unit (CPU), a micro-processing unit (MPU), a digital signal processor (DSP), and a graphics processing unit (GPU).

For example, when the memory system 1 is activated, the processor 7 reads the firmware FW and the address translation table AT from at least one of the memories NM0 to NM33 via at least one of the memory interface units MI0 to MI3. Then, the processor 7 stores the firmware FW and the address translation table AT into the memory unit 6.

For example, before the memory system 1 stops, the processor 7 writes the address translation table AT stored in the memory unit 6 to at least one of the memories NM00 to NM33 via at least one of the memory interface units MI0 to MI3.

In the first embodiment, the processor 7 executes a garbage collection on at least one of the memories NM00 to NM33 via at least one of the memory interface units MI0 to MI3.

For example, the processor 7 implements the functions 71 to 75 according to the firmware FW at a time of data writing processing. Specifically, the processor 7 writes data to the non-volatile storage device 3 at the time of data writing processing. Next, the processor 7 reads the written data from the non-volatile storage device 3. Next, the processor 7 generates parity data corresponding to the read data using the parity storage unit 10 and the error correction unit 8. Then, the processor 7 writes the generated parity data to the memory unit 6, the non-volatile storage device 3, or another non-volatile memory (not illustrated).

For example, the processor 7 reads data from the non-volatile storage device 3 at a time of data reading processing. Next, the processor 7 reads the parity data corresponding to the read data from the memory unit 6, the non-volatile storage device 3, or another non-volatile memory (not illustrated). Then, the processor 7 determines whether an error is included in the read data using the read parity data and the error correction unit 8, and corrects the error when the error is included in the read data.

Next, a configuration of the memory NM00 according to the first embodiment will be described in detail with reference to FIGS. 2 to 5. The memories NM01 to NM33 also have the same configuration as the memory NM00.

Figure 2:
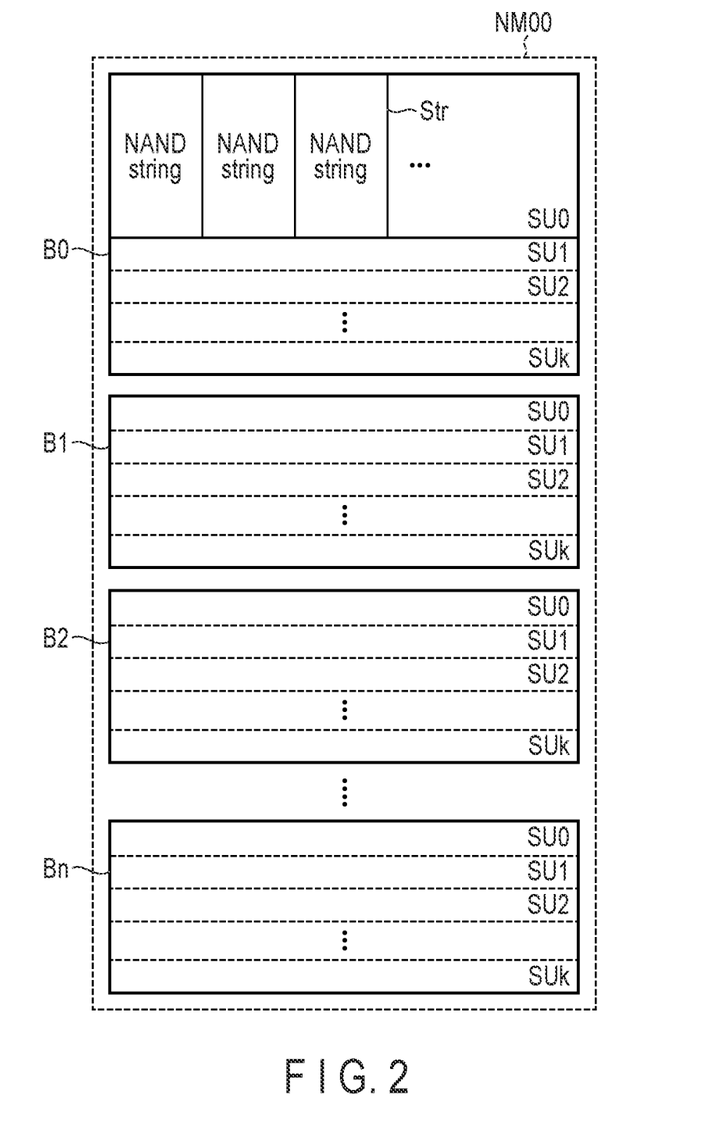
FIG. 2 is a diagram illustrating an example of a configuration of a memory according to the first embodiment.

FIG. 2 is a diagram illustrating an example of a configuration of the memory NM00 according to the first embodiment.

The memory NM00 includes a memory cell array. The memory cell array includes a plurality of non-volatile memory cell transistors. Each of the plurality of non-volatile memory cell transistors is associated with a word line and a bit line. The memory NM00 includes a plurality of blocks B0 to Bn each including a set of a plurality of non-volatile memory cell transistors.

Each of the blocks B0 to Bn of the memory NM00 includes a plurality of string units SU0 to SUk. Each of the plurality of string units SU0 to SUk includes a plurality of NAND strings (hereinafter, referred to as a string) Str. In each string Str, a plurality of memory cell transistors are connected in series.

Hereinafter, when the blocks B0 to Bn are not distinguished, each of the blocks B0 to Bn may be simply referred to as a block B. When the string units SU0 to SUm are not distinguished, each or the string units SU0 to SUm may be simply referred to as a string unit SU. The number n+1 of blocks in the memory NM00 and the number k+1 of string units in one block B are arbitrary.

Figure 3:
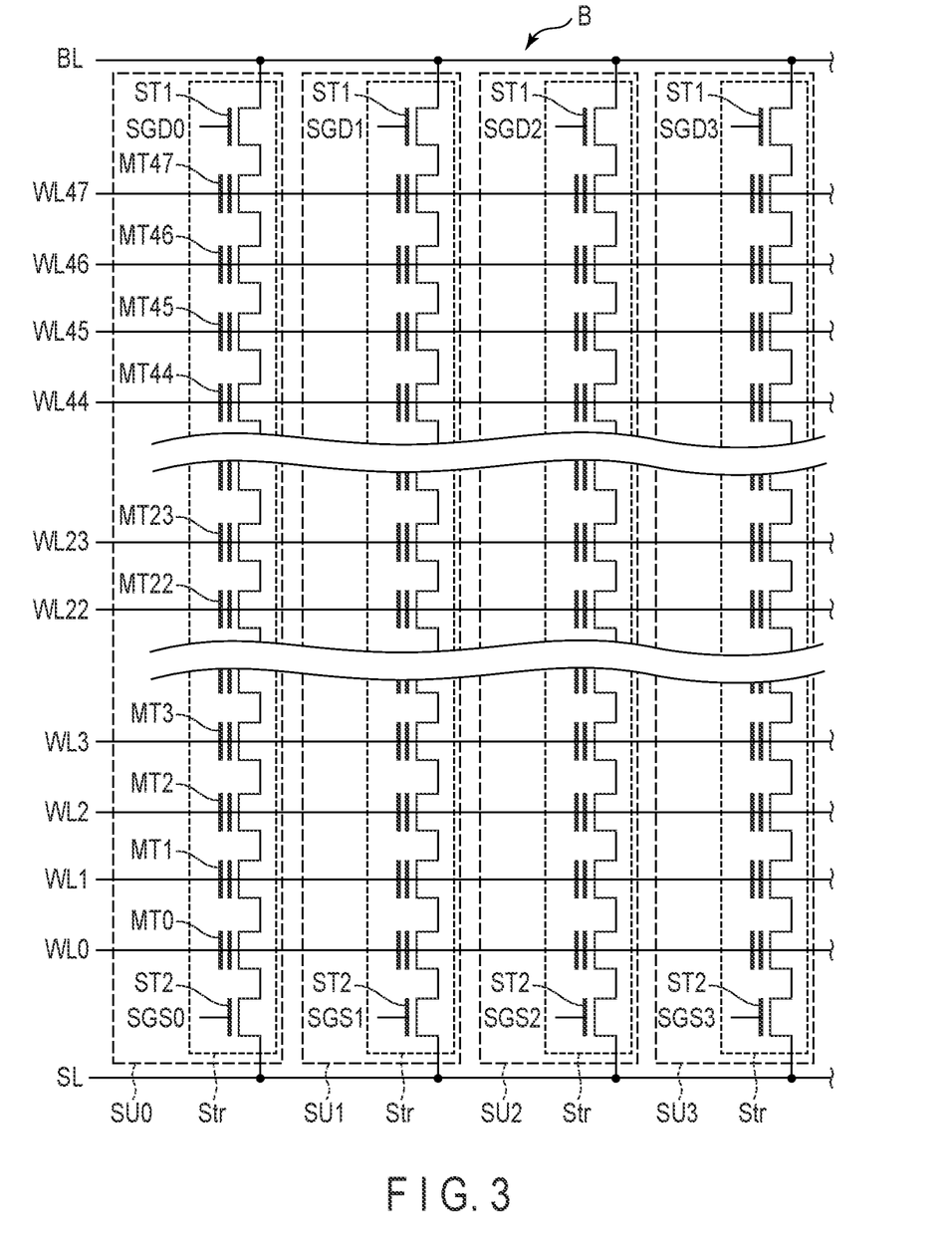
FIG. 3 is a diagram illustrating an example of a configuration of a part of a block.

FIG. 3 is a diagram illustrating an example of a configuration of a part of the block B. FIG. 3 illustrates a part of four string units SU0 to SU3 among the plurality of string units SU0 to SUk provided in the block B.

A plurality of configurations similar to a part of the block B as illustrated in FIG. 3 is provided in the depth direction of the paper surface of the drawing. As described above, the block includes, for example, k+1 string units SU0 to SUk. Each of the string units SU0 to SUk includes a plurality of strings Str and bit lines BL in the depth direction of the paper surface of FIG. 3. More specifically, FIG. 3 illustrates one string Str connected to a certain bit line BL among the plurality of strings Str included in the string unit SU0, one string Str connected to the bit line BL among the plurality of strings Str included in the string unit SU1, one string Str connected to the bit line BL among the plurality of strings Str included in the string unit SU2, and one string Str connected to the bit line BL among the plurality of strings Str included in the string unit SU3.

Each of the strings Str includes, for example, 48 memory cell transistors MT0 to MT47 and selection transistors ST1 and ST2. Each of the memory cell transistors MT0 to MT47 includes a laminated gate including a control gate and a charge storage layer, and stores data in a non-volatile manner. The number of the memory cell transistors MT0 to MT47 is not limited to 48, and may be 8, 16, 32, 64, 128, or the like, and the number is not limited. Hereinafter, when the memory cell transistors MT0 to MT47 are not distinguished, each of the memory cell transistors MT0 to MT47 may be simply referred to as a memory cell transistor MT.

The plurality of memory cell transistors MT are arranged so as to be connected in series between one ends of current paths of the selection transistors ST1, ST2.

Each of gates of the selection transistors ST1 of the strings Str included in each of the string units SU0 to SU3 is connected to each of selection gate lines SGD0 to SGD3. Each of gates of the selection transistors ST2 of the strings included in each of the string units SU0 to SU3 is connected to each of selection gate lines SGS0 to SGS3. On the other hand, each of the control gates of the memory cell transistors MT0 to MT47 in the same block B is commonly connected to each of word lines WL0 to WL47. In the description below, when the selection gate lines SGD0 to SGD3 are not distinguished, each of the selection gate lines SGD0 to SGD3 is also simply referred to as a selection gate line SGD. When the selection gate lines SGS0 to SGS3 are not distinguished, each of the selection gate lines SGS0 to SGS3 is also simply referred to as a selection gate line SGS. When the word lines WL0 to WL47 are not distinguished, each of the word lines WL0 to WL47 may be simply referred to as a word line WL.

While the word lines WL0 to WL47 are commonly connected among the plurality of string units SU0 to SU3 in the same block B, the selection gate lines SGD, SGS are independent for each of the string units SU0 to SU3 even in the same block B. However, the selection gate lines SGS0 to SGS3 may be commonly connected among the string units SU0 to SU3.

In FIG. 3, the other end of the current path of the selection transistor ST1 arranged in each of the plurality of strings Str arranged in the memory cell array is commonly connected to any bit line BL among the plurality of bit lines provided in the block B. The other end of the current path of the selection transistor ST2 arranged in each of the plurality of strings Str is commonly connected to a source line SL.

Data of the memory cell transistors MT in the same block B is collectively erased. On the other hand, reading and writing of data are collectively performed on the plurality of memory cell transistors MT commonly connected to any word line WL in any string unit SU of any block B. A unit to be collectively read and written in this manner is referred to as a "page".

Figure 4:
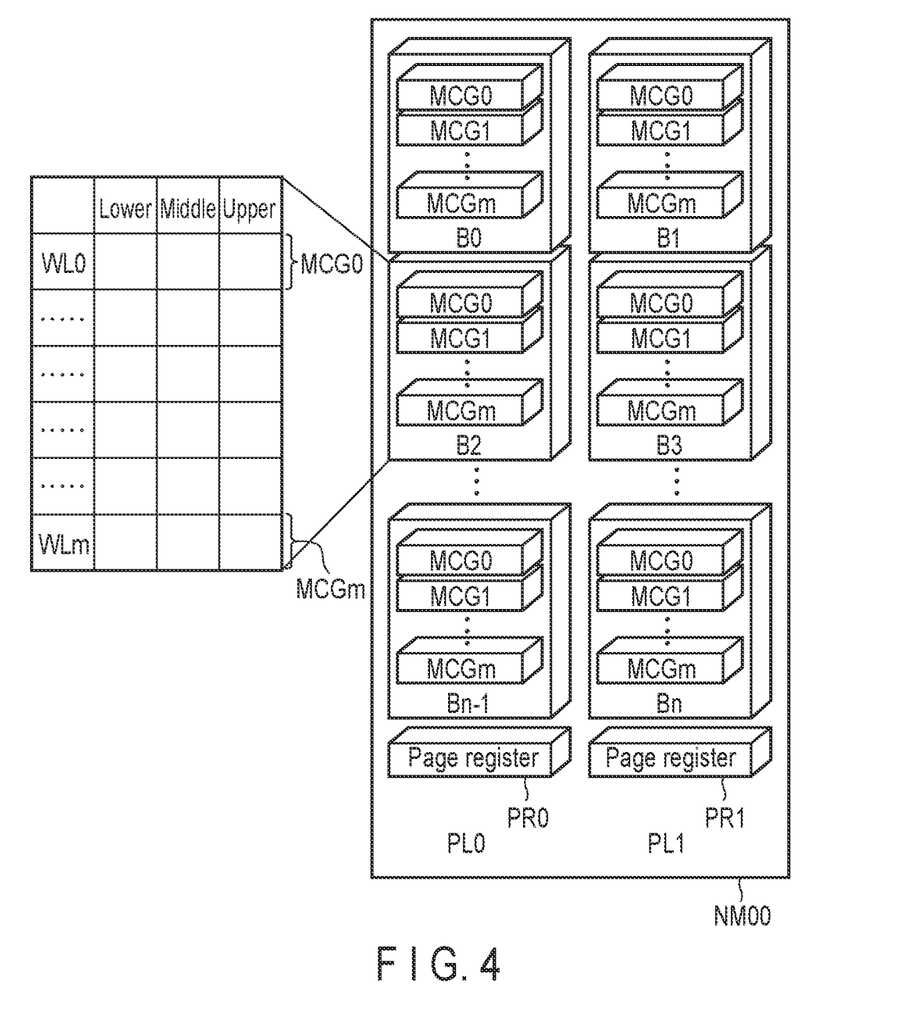
FIG. 4 is a diagram illustrating an example of a relationship between blocks and planes in the memory according to the first embodiment.

FIG. 4 is a diagram illustrating an example of a relationship between the blocks B0 to Bn and the planes PL0 and PL1 in the memory NM00 according to the first embodiment.

The memory NM00 includes a plurality of (for example, two) planes PL0, PL1. The plane PL0 includes blocks B0, B2, . . . , Bn-1 and a page register PR0. The plane PL1 includes blocks B1, B3, . . . , Bn and a page register PR1. Although the block B2 will be described as a representative in FIG. 5, the blocks B0, B1, B3 to Bn are similar to the block B2.

The block B2 includes a plurality of pages. The block B2 includes a plurality of word lines WL0 to WLm and a plurality of memory cell transistors MT connected to the respective word lines WL0 to WLm.

In the first embodiment, it is assumed that one memory cell transistor MT is a triple level cell (TLC) capable of storing 3-bit information. The memory cell transistor MT may be, for example, a single level cell (SLC) capable of storing 1-bit information, a multi level cell (MLC) capable of storing 2-bit information, or a quad level cell (QLC) capable of storing 4-bit information, or may store information of 5-bit or more.

Hereinafter, a group of the memory cell transistors MT collectively selected in the data writing processing or the data reading processing is referred to as a "memory cell group".

In one string unit SU, the plurality of memory cell transistors MT connected to the word line WL0 correspond to a memory cell group MCG0. Similarly, in one string unit SU, the memory cell transistors MT connected to the word lines WL1 to WLm respectively correspond to the memory cell groups MCG1 to MCGm. The 3-bit data stored in the TLC is a lower bit, a middle bit, and an upper bit in order from the lower side.

In the memory cell group MCG0, a set of lower bits is a lower page, a set of middle bits is a middle page, and a set of upper bits is an upper page. Each of the memory cell groups MCG1 to MCGm includes a lower page, a middle page, and an upper page as similar to the memory cell group MCG0.

Operation of generating parity data according to the first embodiment will be described below.

Figure 5:
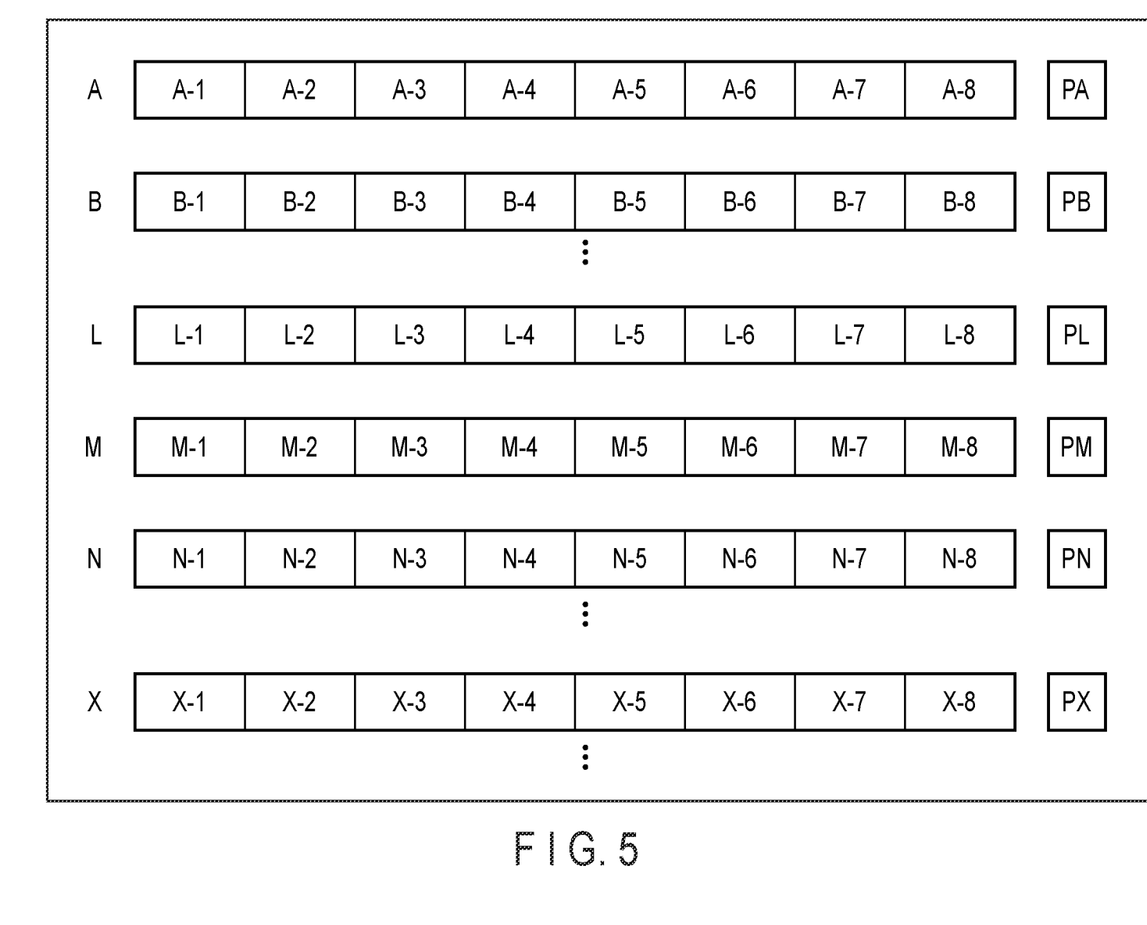
FIG. 5 is a diagram illustrating an example of a configuration of frames according to the first embodiment.

FIG. 5 is a diagram illustrating an example of a configuration of frames A to X according to the first embodiment.

In the first embodiment, a frame is, for example, a unit including data for generating one piece of parity data. In the description below, the frame is unit of data for generating one piece of parity data and will also be described as the data itself.

The frame A is divided into a plurality of subframes A-1 to A-8. The error correction unit 8 generates parity data PA for the frame A.

As similar to the frame A, each of the frames B to X is divided into eight subframes B-1 to B-B, . . . , X-1 to X-8. The error correction unit 8 generates each of pieces of parity data (that is, parities) PB to PX for each of the frames B to X.

Hereinafter, when the pieces of parity data PA to PX are not distinguished, each of the pieces or parity data PA to PX may be simply referred to as parity data P#.

A sizes of the subframes A-1 to A-8, . . . , X-1 to X-8 are the same. A size of each of the parity data PA to PX is the same as the size of each of the subframes A-1 to A-8, . . . , X-1 to X-8. The number of subframes constituting one frame can be changed as appropriate.

Figure 6:
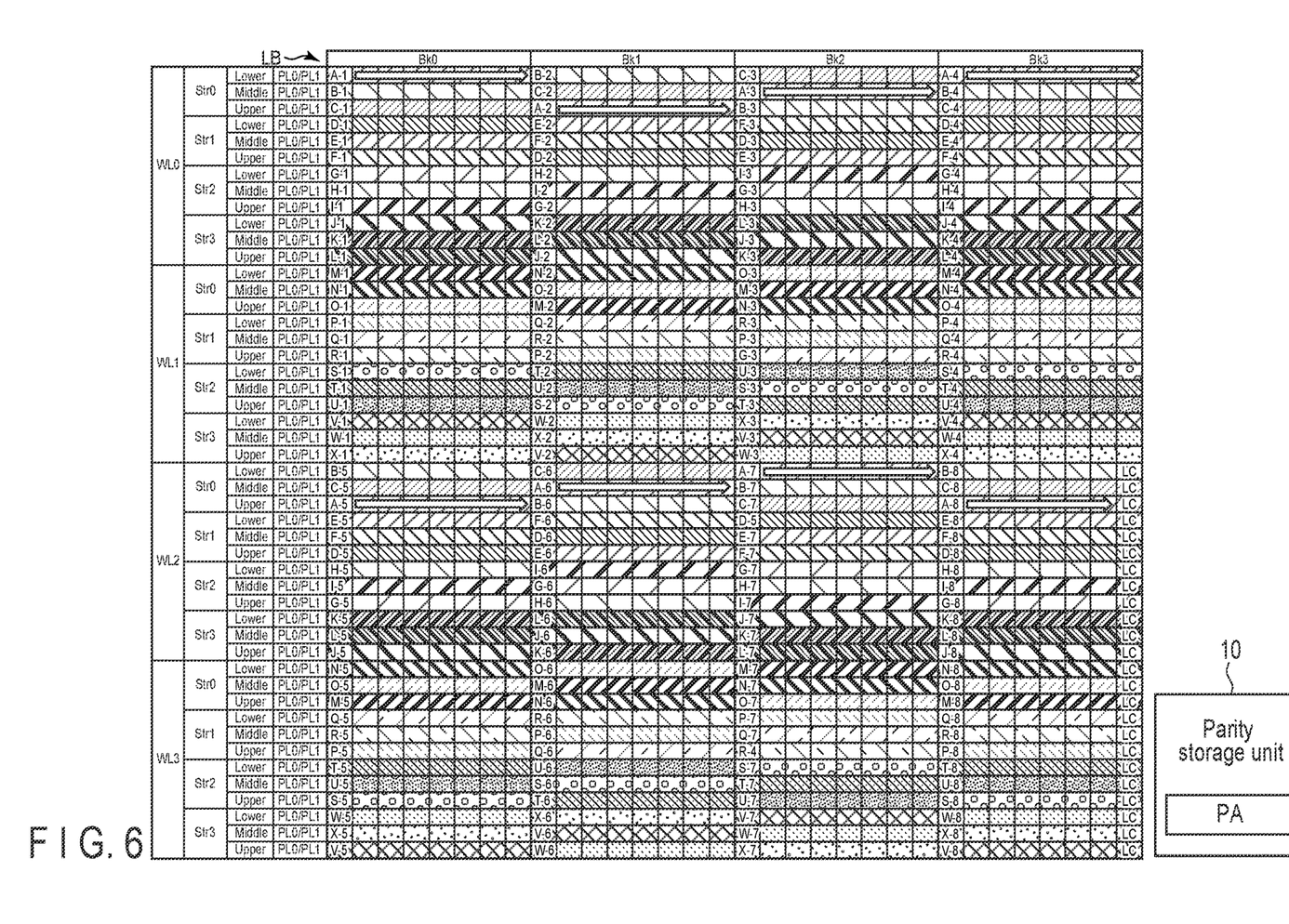
FIG. 6 is a diagram illustrating an example of a logical block and a parity storage unit according to the first embodiment.

FIG. 6 is a diagram illustrating an example of a logical block LB and the parity storage unit 10 according to the first embodiment.

FIG. 6 illustrates a case where the number of word lines WL is four or more, the number of banks Bk is four, and four strings Str are associated with one word line WL. A case where the type of the memory cell transistor MT of the logical block LB is TLC is illustrated. However, in the first embodiment, the number of word lines WL, the number of banks Bk, the number of strings Str associated with the word line WL, the number of planes PL, and the type of the memory cell transistor MT can be appropriately changed according to characteristics of the memories NM00 to NM33. The plurality of blocks B included in the logical block LB belong to the plane PL0 or the plane PL1. FIG. 6 illustrates portions of the word lines WL0 to WLm corresponding to the word lines WL0 to WL3, and omits portions corresponding to the word lines WL4 to WLm.

FIG. 6 illustrates a state where the frames A to X are written to the word lines WL0 to WL3.

In FIG. 6, four strings Str0 to Str3 are associated with each of the word lines WL0 to WL3 in the vertical direction of FIG. 6. Three pages (lower page/middle page/upper page) are associated with each of the strings Str0 to Str3 in the vertical direction. As described above, one word line WL corresponds to the four strings Str0 to Str3. One string Str corresponds to three pages.

In FIG. 6, four banks Bk0 to Bk3 are arranged in the lateral direction.

In the logical block LB having such a configuration of the word lines WL, the strings Str, the pages, and the banks Bk, four subframes belonging to each of 12 different frames, are written to one word line WL (that is, 48 subframes are written to one word line WL).

The processor 7 determines allocation of frames for generating pieces of parity data in parallel according to the characteristics of the memories NM00 to NM33. In the case of FIG. 6, the processor 7 determines to allocate 24 frames A to X to the two word lines, and generates the pieces of parity data for the 24 frames A to X in parallel. The characteristics of the memories NM00 to NM33 may be, for example, an error mode when data stored in the memories NM00 to NM33 is read, physical characteristics according to storage positions of the memories NM00 to NM33, or the like.

The processor 7 allocates and writes the frames A to X to the logical block LB over, for example, two word lines WL in ascending order of numbers of the word lines WL0 to WLm.

Specifically, the processor 7 writes the subframes A-1 to A-4, B-1 to B-4, C-1 to C-4 to the string Str0 and the banks Bk0 to Bk3 of the word line WL0. Next, the processor 7 writes the subframes D-1 to D-4, E-1 to E-4, F-1 to F-4 to the string Str1 and the banks Bk0 to Bk3 of the word line WL0. Next, the processor 7 writes the subframes G-1 to G-4, H-1 to H-4, I-1 to I-4 to the string Str2 and the banks Bk0 to Bk3 of the word line WL0. Next, the processor 7 writes the subframes J-1 to J-4, K-1 to K-4, L-1 to L-4 to the string Str3 and the banks Bk0 to Bk3 of the word line WL0.

Next, the processor 7 writes the subframes M-1 to M-4, N-1 to N-4, O-1 to O-4 to the string Str0 and the banks Bk0 to Bk3 of the word line WL1. Next, the processor 7 writes the subframes P-1 to P-4, Q-1 to Q-4, R-1 to R-4 to the string Str1 and the banks Bk0 to Bk3 of the word line WL1. Next, the processor 7 writes the subframes S-1 to S-4, T-1 to T-4, U-1 to U-4 to the string Str2 and the banks Bk0 to Bk3 of the word line WL1. Next, the processor 7 writes the subframes V-1 to V-4, W-1 to W-4, X-1 to X-4 to the string Str3 and the banks Bk0 to Bk3 of the word line WL1.

Hereinafter, the processor 7 writes the subframes A-5 to A-B, . . . , L5 to L8 to each of the strings Str0 to Str3 and the banks Bk0 to Bk3 of the word line WL2, and then writes the sub-frames M-5 to M-8, . . . , X-5 to X-8 to each of the strings Str0 to Str3 and the banks Bk0 to Bk3 of the word line WL3, in a procedure similar to that of the word lines WL0 and WL1.

In other words, in the first embodiment, writing is executed in series for the plurality of word lines WL. Writing is executed in series for a plurality of strings Str in one word line WL.

Determining (selecting) the number of parallel of frames to be read and the locations of the frames to be read when calculating pieces of parity data may be expressed as combining frames.

For example, when writing to the bank Bk3 of the word lines WL2, WL3, that is, to a position LC in FIG. 6 is completed, the processor 7 can generate the parity data PA to PX for the frames A to X, respectively.

The processor 7 determines whether the writing state for the block LB satisfies parity generation condition. The parity generation condition may be, for example, that writing of a particular amount (for example, the data size of frames A to X or more) with respect to the block LB is completed, that writing to a particular position LB of the block LB is completed, that writing to a particular position written after the position LC of the block LB is completed, or that writing to the end of the block LB (for example, the bank Bk3 of the word line WLm) is completed.

When the writing state with respect to the block LB satisfies the parity generation condition, the processor 7 detects the memory size that can be used as the parity storage unit 10 based on the state of the memory unit 6 and the like. Then, the processor 7 determines a frame that has been written to the block LB and is to be read for generating parity data based on the detected memory size. FIG. 6 illustrates a case where the frame A is determined as a target for generating parity data. However, other frames B to X may be determined as a target for generating parity data. At least two of the frames A to X may be determined as targets for generating at least two of pieces of parity data.

The processor 7 reads the frame A determined as the parity generation target from the block LB. The processor 7 generates the parity data PA for the read frame A using the error correction unit 8 and the parity storage unit 10, and writes the generated parity data PA in a non-volatile state. The generated parity data PA may be written in, for example, the memory unit 6, the non-volatile storage device 3, or another non-volatile memory.

Figure 7:
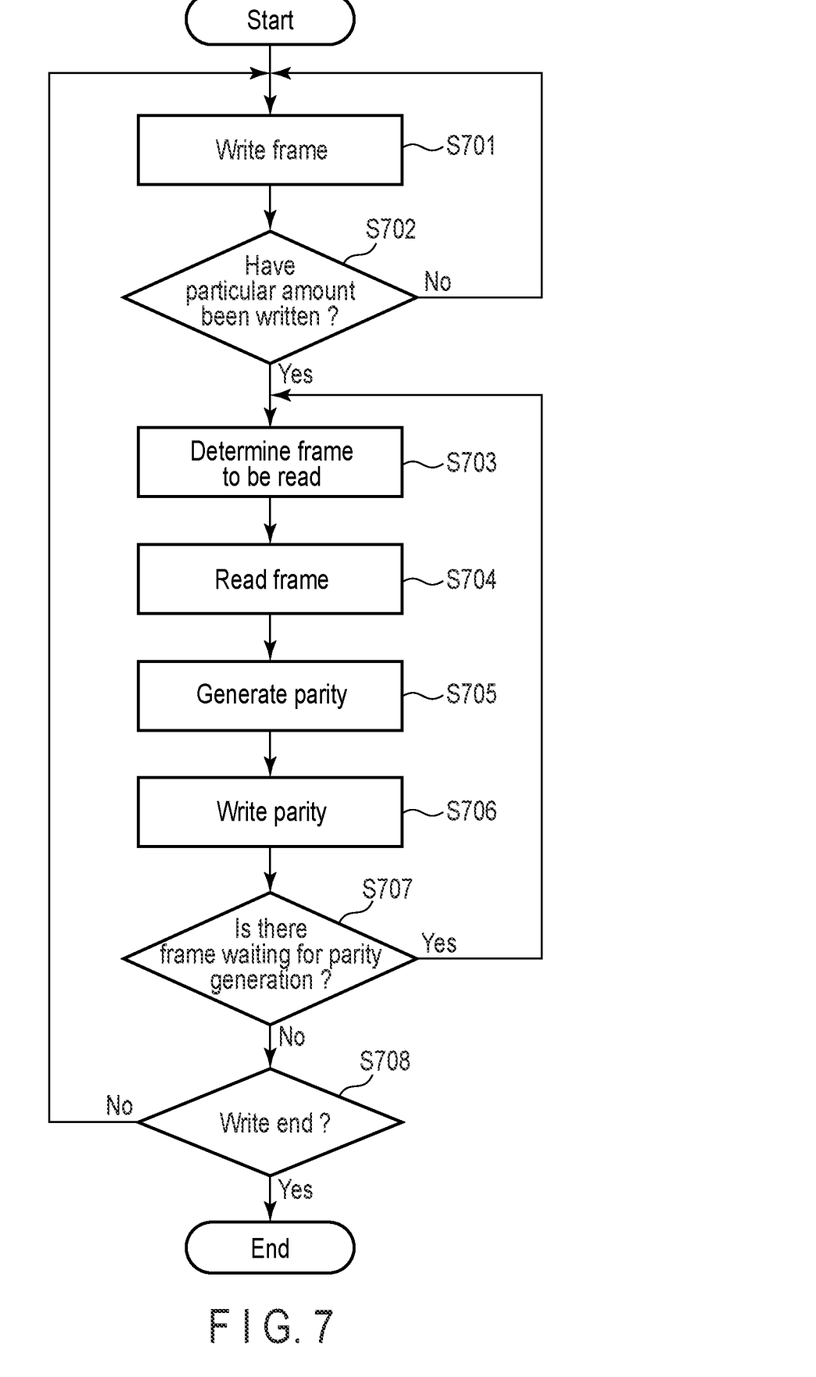
FIG. 7 is a flowchart illustrating an example or frame writing processing and parity generation processing according to the first embodiment.

FIG. 7 is a flowchart illustrating an example of frame writing processing and parity generation processing according to the first embodiment.

In S701, the processor 7 writes one or more frames to the logical block LB.

In S702, the processor 7 determines whether one or more frames of a particular amount (first amount) have been written to the logical block LB.

When one or more frames of the particular amount are not written to the logical block LB (No in S702), the process proceeds to S701.

When one or more frames of the particular amount have been written to the logical block LB (Yes in S702), in S703, the processor 7 determines one or more frames of a second amount that are included in one or more frames of the particular amount already written to the logical block LB and to be read to generate one or more pieces of parity data P# based on the state of the memory unit 6 (for example, a memory size available for generating one or more pieces of parity data P#) or the like. Here, the second amount is smaller than the particular amount (first amount).

In S704, after completion of the writing of one or more frames of the particular amount, the processor 7 reads the determined one or more frames of the second amount from the logical block LB.

In S705, the processor 7 generates one or more pieces of parity data P# corresponding to one or more read frames of the second amount using the error correction unit 8 and the parity storage unit 10.

In S706, the processor 7 writes the generated one or more pieces of parity data P# in the non-volatile state, for example, to the memory unit 6, the non-volatile storage device 3, or another non-volatile memory.

In S707, the processor 7 determines whether there is a frame waiting for parity generation.

When there is a frame waiting for parity generation (Yes in S707), the process proceeds to S703. In S703, the processor 7 determines one or more frames of a third amount which are included in the frames of the particular amount already written in the logical block LB and to be read for generating new one or more pieces of parity data, based on the state of the memory unit 6 or the like. Thereafter, processing similar to that after S704 described above is repeated.

When there is no frame waiting for parity generation (No in S707), in S708, the processor 7 determines whether to end writing of the frames.

When writing is not ended (No in S708), the process proceeds to S701.

When writing is ended (Yes in S708), the process ends.

Hereinafter, processing of determining the number of parallel of frames read to generate parity data will be described.

For example, a case where the memory system 1 reads the frame A with the parallel number of 1 after the frames A to X are written to the logical block LB and generates the parity PA of the read frame A will be considered.

In this case, the size of the memory required to generate the parity PA may be a parity size of one frame.

First, the processor 7 secures the parity storage unit 10 having the parity size of one frame and reads a plurality of subframes A-1 to A-8 included in one frame A. The processor 7 generates the parity PA corresponding to the frame A using the secured parity storage unit 10, and non-volatilizes the generated parity PA.

Next, the processor 7 reads a plurality of subframes B-1 to B-8 included in one frame B. The processor 7 generates the parity PB corresponding to the frame B using the party storage unit 10 having the parity size of one frame, and non-volatilizes the generated party PB.

Thereafter, similarly, the processor 7 sequentially executes similar processing frame by frame from the frame C to the frame X. That is, the processor 7 sequentially generates the parity PC to the parity PX frame by frame using the parity storage unit 10 having the parity size of one frame, and sequentially non-volatilizes the parity PC to the parity PX frame by frame.

The processor 7 advances the writing processing of a frame after the frame X even while reading the frames A to X and generating the party data PA to PX. In other words, the processor 7 executes the writing processing of other frame to be written after the frames A to X to the non-volatile storage device 3 and the processing for generating the parity data PA to PX corresponding to the frames A to X by pipeline processing.

The processor 7 determines the parallel number based on the memory size that can be used to generate one or more pieces of parity data P# as the parity storage unit 10.

For example, in a case where the memory size that can be used to generate one or more pieces of parity data P# is large, the processor 7 can increase the parallel number.

For example, in a case where the memory size that can be used to generate one or more pieces of parity data P# is small, the processor 7 can reduce the parallel number.

The processor 7 may determine the parallel number according to a table in which a memory size that can be used to generate one or more pieces of parity data P# and the parallel number are associated with each other. Alternatively, the processor 7 may determine the parallel number using a calculation formula for calculating the parallel number from the memory size that can be used to generate one or more pieces of parity data P#.

As in the first embodiment, the memory size of the parity storage unit 10 used to generate one or more pieces of parity data P# can be determined and changed by determining and changing the parallel number for reading one or more frames and generating one or more pieces of parity data P#.

An effect of the memory system 1 according to the first embodiment will be described by comparing the memory system 1 according to the first embodiment described above with a memory system of a comparative example, using FIG. 6.

The memory system of the comparative example generates the pieces of parity data PA to PX corresponding to the plurality of frames A to X using the parity storage unit of the comparative example while writing the plurality of frames A to X to the logical block LB.

When writing to the block LB is completed up to the position LC, the memory system of the comparative example non-volatilizes the parity data PA to PX for each of the plurality of frames A to X.

As similar to the memory system 1 according to the first embodiment, the memory system of the comparative example writes a frame to the string Str0 of the word line WL0, then writes a frame to the string Str1 of the word line WL0, and repeats similar processing. The memory system of the comparative example executes processing for parity generation simultaneously with writing. In the memory system of the comparative example, the number of frames for which parity generation is executed in parallel is assumed to be 24, for example. In this case, in the memory system of the comparative example, it is necessary to secure a parity storage unit having a memory size corresponding to the plurality of pieces of parity data PA to PX. Therefore, the parity storage unit of the comparative example needs to have a memory size of (parity size per frame)×24. Assuming that the size of the parity data P# is q kibibyte and the number of frames written in parallel is r, the parity storage unit of the comparative example used to generate the parity data PA to PX needs to have a memory size of q×r kibibyte. For example, in a case where q=32 and r=24, a memory size of 768 kilobytes is secured as the parity storage unit of the comparative example. The memory size that can be used as the parity storage unit of the comparative example is affected by the usage amount of the memory unit 6. The memory size of the parity storage unit of the comparative example is preferably as small as possible because it affects the cost and power consumption of the memory system of the comparative example.

As described above, the memory system of the comparative example generates pieces of parity data using the parity storage unit of the comparative example in parallel with the writing of the frames to the logical block LB. The memory system of the comparative example determines whether the pieces of parity data corresponding to the frames written in parallel are completed, and when the pieces of parity data are completed, the pieces of parity data written in the parity storage unit of the comparative example are non-volatilized.

In such the memory system of the comparative example, as the number of frames written in parallel increases, the memory size of the parity storage unit of the comparative example used to generate the pieces of parity data also increases.

On the other hand, in the memory system 1 according to the first embodiment, one or more pieces of parity data are generated after the frames A to X of the particular amount (first amount) are written in the logic block LB. After the frames A to X are written, the memory system 1 determines the number of parallel corresponding to the memory size available for parity generation, and reads, from the logical block LB, the number of parallel of frames (that is the second amount of frames) to be subjected to party generation. Then, the memory system 1 generates the pieces of parity data using the parity storage unit 10 having the memory size corresponding to the read frames of the second amount, and writes the generated pieces of parity data to the memory unit 6, the non-volatile storage device 3, or another non-volatile memory in a non-volatile state.

In such a memory system 1 according to the first embodiment, by reducing the number of parallel of parity generation target frames read from the logical block LB at a time of parity generation, the size of the memory used for parity generation can be reduced as compared with the memory system of the comparative example. Therefore, the memory system 1 according to the first embodiment can reduce cost and power consumption as compared with the memory system of the comparative example.

In the first embodiment, instead of generating parity data while writing a frame, at least one frame for generating parity data is determined after writing of a particular amount or a particular position is completed, the determined at least one frame is read from the logical block LB, and at least one piece of parity data corresponding to the at least one frame is generated. Therefore, in the first embodiment, the parity generation can be started under a condition suitable for generating the parity data. In the first embodiment, the number of pieces of parity data generated in parallel is made smaller than the number of parallel of the frame writing processing, so that the memory size used to generate the parity data can be set to be small. For example, in a case where the parity data is generated for each frame, the size of the memory used to generate the parity data may be one parity size.

In the first embodiment, the processor 7 executes writing processing of one or more other frames to be written after the frames A to X to the non-volatile storage device 3 and processing for generating the parity data PA to PX corresponding to the frames A to X by pipeline processing. As a result, a decrease in the performance of the processor 7 can be suppressed.

In the first embodiment, parity generation can be repeated until there is no frame waiting for parity generation, When the characteristics of the memories NM00 to NM33 change, a configuration of the frame to be written to the logical block LB may also change. In the first embodiment, even if the configuration of the frame changes, the number of parallel of frames for generating parity data can be determined according to the memory size available for parity generating, and the parity data can be flexibly generated according to the determined number of parallel of frames.

Second Embodiment

In a second embodiment, a case where the generation of the parity data according to the first embodiment is used in a garbage collection processing will be described.

Figure 8:
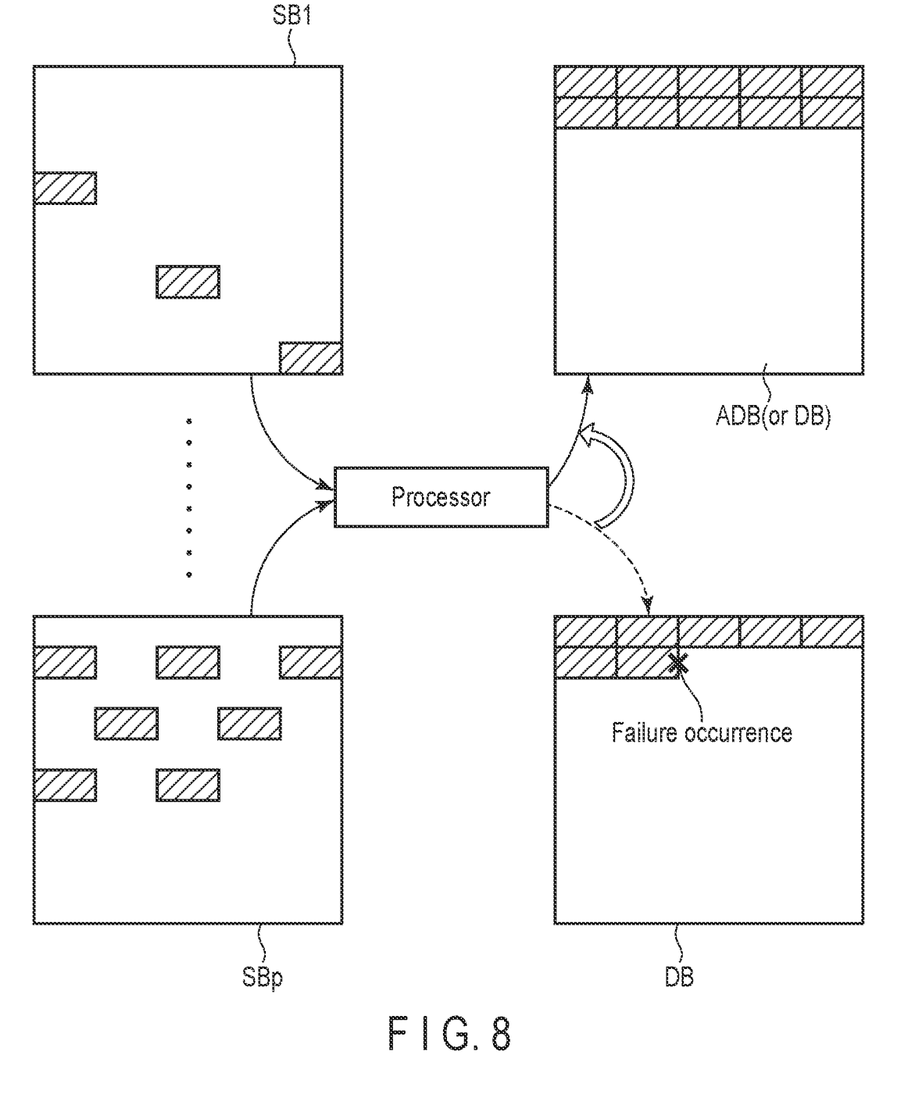
FIG. 8 is a diagram illustrating an example of processing of a garbage collection according to a second embodiment.

FIG. 8 is a diagram illustrating an example of processing of a garbage collection according to the second embodiment.

By executing the garbage collection processing, the processor 7 collectively rearranges data, which is arranged in fragments in garbage collection source blocks SB1 to SBp in memories NM00 to NM33, into a garbage collection destination block DB, and invalidates data in the garbage collection source blocks SB1 to SBp. In FIG. 8, p is two or more. The number of garbage collection destination blocks DB is smaller than the number of garbage collection source blocks SB1 to SBp.

The processor 7 executes the parity generation processing described the first embodiment at a time of writing of data in rearrangement to the garbage collection destination block DB.

Specifically, in the garbage collection processing, the processor 7 reads data from the garbage collection source blocks SB1 to SBp, and writes the data read from the garbage collection source blocks SB1 to SBp to the garbage collection destination block DB. After completion of writing to the garbage collection destination block DB, the processor 7 reads the written data from the garbage collection destination block PB. The processor 7 generates parity data corresponding to the data read from the garbage collection destination block DB and non-volatilizes the generated parity data.

As illustrated in FIG. 8, it is assumed that a failure such as power disconnection of the memory system 1 occurs during writing of data to the garbage collection destination block DB, and the parity data is not generated.

In such a case, the processor 7 invalidates data stored in the garbage collection destination block DB in which the writing of the data has progressed partway. The processor 7 moves data from the garbage collection source blocks SB1 to SBp to another garbage collection destination block ADB, invalidates the data stored in the garbage collection source blocks SB1 to SBp, and generates parity data. Alternatively, the processor 7 erases the data stored in the garbage collection destination block DB in which the writing of the data has progressed partway. Then, again the processor 7 starts to move data from the garbage collection source blocks SB1 to SBp to the garbage collection destination block DB, invalidates the data stored in the garbage collection source blocks SB1 to SBp, and generates parity data.

In the second embodiment described above, it is possible to reduce the memory size of a parity storage unit 10 used to generate the parity data at a time of the garbage collection processing.

In the second embodiment, the garbage collection source block SB is used as a backup. As a result, when a failure occurs during the garbage collection, the garbage collection can be resumed, and the reliability of the memory system 1 can be increased.

In the second embodiment, a case where the generation of the parity data according to the first embodiment is used in the garbage collection is described. However, the generation of the parity data according to the first embodiment may be executed at a time of another background processing executed in the memory system 1, such as refreshing or wear leveling.

In the second embodiment, the processor 7 may execute parity generation as performed in the memory system of the comparative example at a time of writing processing other than background processing such as a garbage collection, a refreshing, a wear leveling, or the like. The writing processing other than the background processing includes, for example, processing of writing data according to a writing command from a host device 2.

Specifically, the processor 7 may write writing target data to a non-volatile storage device 3 at the time of the writing processing other than the background processing, start generation (or calculation) of parity data corresponding to the writing target data before the writing of the writing target data is completed, and write the generated parity data corresponding to the writing target data to the memory for parity storage. In this case, appropriate parity generation can be executed according to the type of the writing processing.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
a non-volatile memory; and
a controller configured to control the non-volatile memory,
wherein the controller is configured to:
write data of a first amount to the non-volatile memory;
determine data of a second amount that is included in the data of the first amount and is a parity generation target, the second amount being less than the first amount;
read the data of the second amount from the non-volatile memory after writing the data of the first amount is completed;

generate parity data corresponding to the read data of the second amount; and
write the generated parity data to a memory for parity storage.

2. The memory system according to claim 1,
wherein, after completion of writing of first data of a particular amount to the non-volatile memory, the controller is further configured to read data that is included in the first data and for which the writing is completed from the non-volatile memory, and generate parity data corresponding to the read data.

3. The memory system according to claim 1,
wherein, after completion of writing of first data to a particular position of the non-volatile memory, the controller is further configured to read data that is included in the first data and for which the writing is completed from the non-volatile memory, and generate parity data corresponding to the read data.

4. The memory system according to claim 1,
wherein the controller is further configured to determine the data of the second amount based on a memory size available for generation of the parity data.

5. The memory system according to claim 1,
wherein the controller is further configured to write the parity data corresponding to the data of the second amount to the memory for parity storage, and then determine data different from the data of the second amount among the data of the first amount as a new parity generation target.

6. The memory system according to claim 1,
wherein the controller is further configured to execute writing processing of other data to be written after data to the non-volatile memory and processing for generating the parity data corresponding to the data by pipeline processing.

7. The memory system according to claim 1,
wherein, in a garbage collection processing, the controller is further configured to:
read data from a garbage collection source block of the non-volatile memory;
write the data read from the garbage collection source block to a garbage collection destination block of the non-volatile memory;
read the written data from the garbage collection destination block after writing to the garbage collection destination block is completed;
generate parity data corresponding to the data read from the garbage collection destination block; and
write the generated parity data to the memory for parity storage.

8. The memory system according to claim 7,
wherein the controller is further configured to write writing target data to the non-volatile memory at a time of writing processing that is not the garbage collection processing, start generation of parity data corresponding to the writing target data before writing of the writing target data is completed, and write the generated parity data corresponding to the writing target data to the memory for parity storage.

9. A control method for a memory system including a non-volatile memory, the method comprising:
writing data of a first amount to the non-volatile memory;
determining data of a second amount that is included in the data of the first amount and is a parity generation target, the second amount being less than the first amount;
reading the data of the second amount from the non-volatile memory after the writing is completed;
generating parity data corresponding to the read data of the second amount; and
writing the generated parity data to a memory for parity storage.

10. The control method according to claim 9, further comprising:
after completion of writing of first data of a particular amount to the non-volatile memory, reading data that is included in the first data and for which the writing is completed from the non-volatile memory; and
generating parity data corresponding to the read data.

11. The control method according to claim 9, further comprising:
after completion of writing of first data to a particular position of the non-volatile memory, reading data that is included in the first data and for which the writing is completed from the non-volatile memory; and
generating parity data corresponding to the read data.

12. The control method according to claim 9, further comprising
determining the data of the second amount based on a memory size available for generation of the parity data.

13. The control method according to claim 9, further comprising
writing the parity data corresponding to the data of the second amount to the memory for parity storage, and then determining data different from the data of the second amount among the data of the first amount as a new parity generation target.

14. The control method according to claim 9, further comprising
executing writing processing of other data to be written after data to the non-volatile memory and processing for generating the parity data corresponding to the data by pipeline processing.

15. The control method according to claim 9, further comprising, in a garbage collection processing:
reading data from a garbage collection source block of the non-volatile memory;
writing the data read from the garbage collection source block to a garbage collection destination block of the non-volatile memory;
reading the written data from the garbage collection destination block after writing to the garbage collection destination block is completed;
generating parity data corresponding to the data read from the garbage collection destination block; and
writing the generated parity data to the memory for parity storage.

16. The control method according to claim 15, further comprising
writing writing target data to the non-volatile memory at a time of writing processing that is not the garbage collection processing, starting generation of parity data corresponding to the writing target data before writing of the writing target data is completed, and writing the generated parity data corresponding to the writing target data to the memory for parity storage.

17. A memory system comprising:
a non-volatile memory; and
a controller configured to control the non-volatile memory,
wherein the controller is configured to:
write data to the non-volatile memory;

read the written data from the non-volatile memory after writing of the data is completed;
generate parity data corresponding to the read data; and
write the generated parity data to a memory for parity storage, and wherein
in a garbage collection processing, the controller is further configured to:
read data from a garbage collection source block of the non-volatile memory;
write the data read from the garbage collection source block to a garbage collection destination block of the non-volatile memory;
read the written data from the garbage collection destination block after writing to the garbage collection destination block is completed;
generate parity data corresponding to the data read from the garbage collection destination block; and
write the generated parity data to the memory for parity storage.

18. The memory system according to claim 17, wherein the controller is further configured to write writing target data to the non-volatile memory at a time of writing processing that is not the garbage collection processing, start generation of parity data corresponding to the writing target data before writing of the writing target data is completed, and write the generated parity data corresponding to the writing target data to the memory for parity storage.

\* \* \* \* \*